Aug. 11, 1931.    A. T. McWANE    1,818,493
PIPE COUPLING
Filed Sept. 24, 1929    2 Sheets-Sheet 1
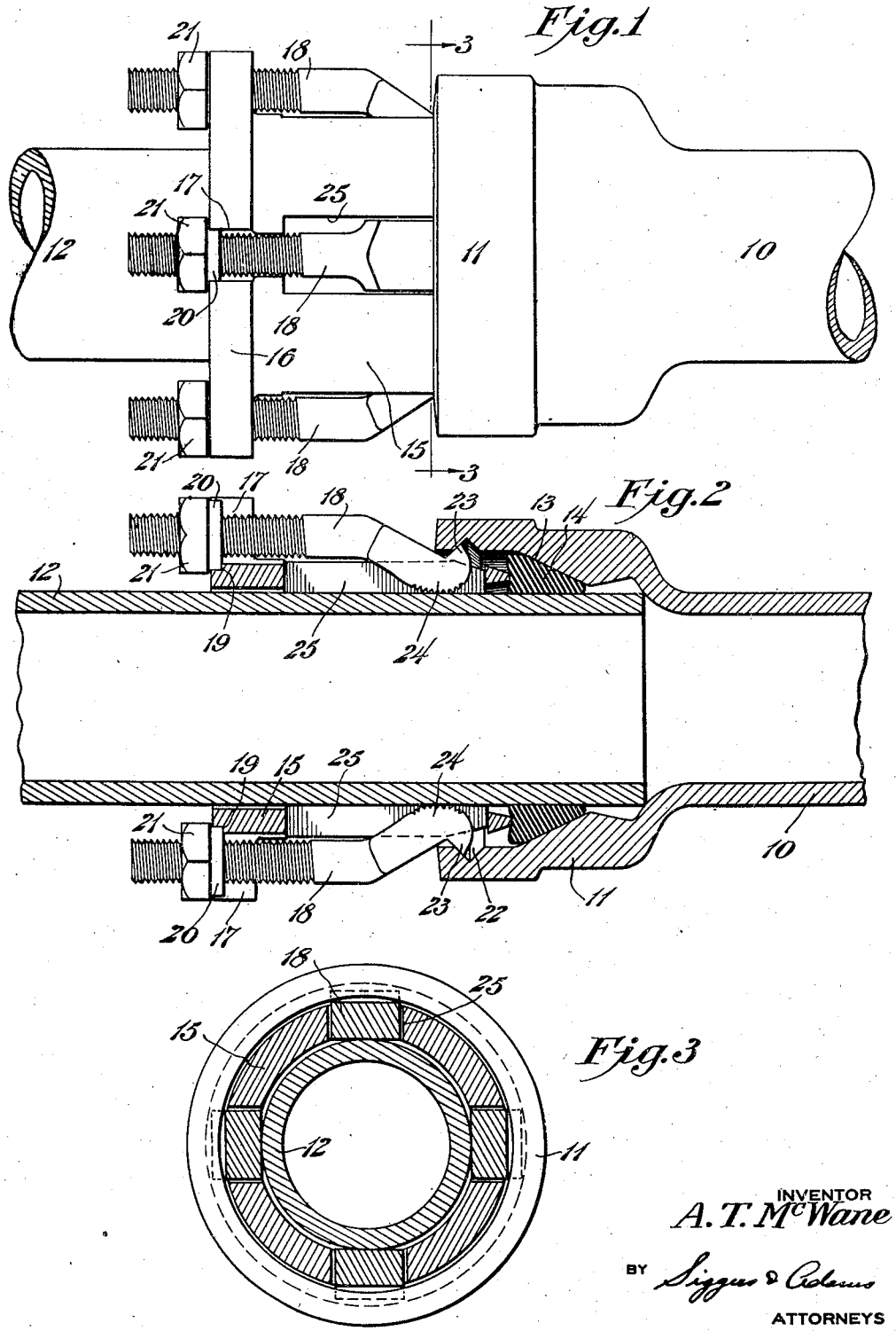

Aug. 11, 1931.  A. T. McWANE  1,818,493
PIPE COUPLING
Filed Sept. 24, 1929  2 Sheets-Sheet 2
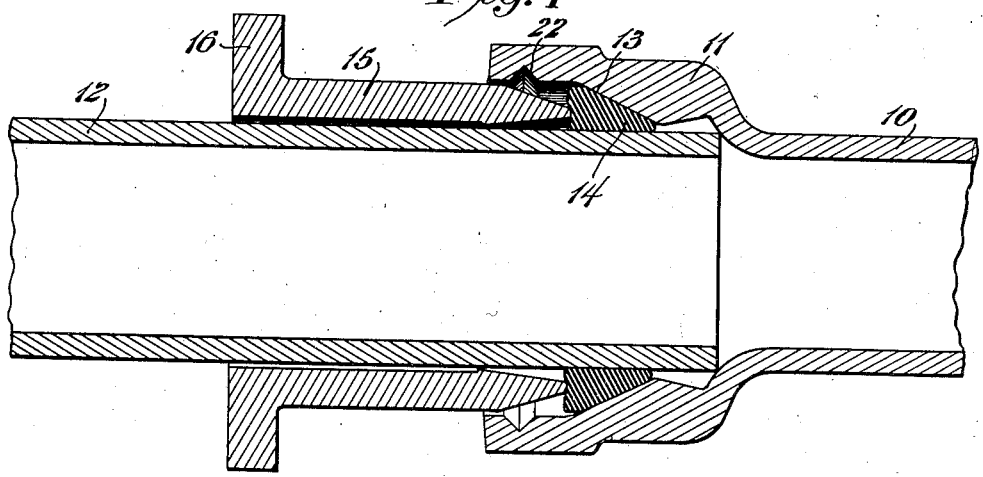
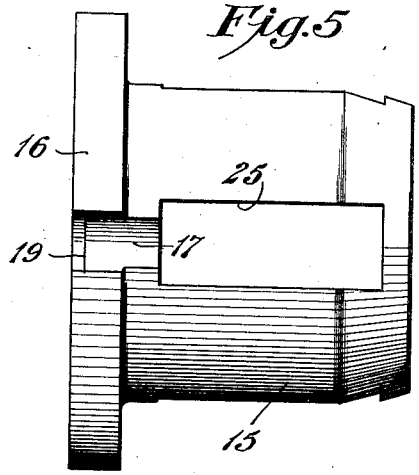
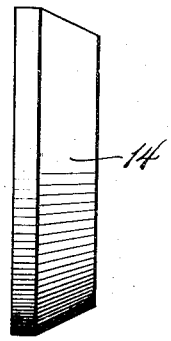
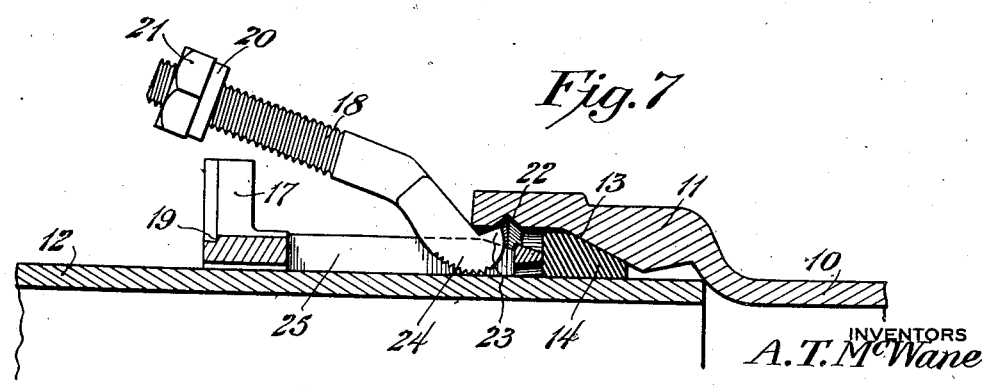
INVENTORS
A. T. McWane
BY
Siggers & Adams
ATTORNEYS Patented Aug. 11, 1931

1,818,493

UNITED STATES PATENT OFFICE

ARTHUR T. McWANE, OF BIRMINGHAM, ALABAMA

PIPE COUPLING

Application filed September 24, 1929. Serial No. 394,757.

This invention relates to pipe couplings of the gland and packing type, and, among other objects, aims to provide important improvements in the coupling shown in my Patent No. 1,474,435, one of the main features being to simplify the construction and to make provision for removing and inserting the anchor bolts or holding means without disturbing or removing the packing gland. Other aims and advantages of the invention will appear in the specification, when considered in connection with the accompanying drawings showing one illustrative embodiment thereof, and in which:—

Fig. 1 is a side elevation of the preferred design of pipe coupling applied to sections of bell and spigot pipes;

Fig. 2 is a central, longitudinal sectional view of the coupling shown in Fig. 1;

Fig. 3 is a transverse sectional view taken on the line 3—3 of Fig. 1;

Fig. 4 is a longitudinal sectional view showing the coupling before the anchor bolts are applied;

Fig. 5 is a side elevation of the preferred form of packing gland;

Fig. 6 is a side elevation of a rubber packing ring suitable for use in making the joint; and Fig. 7 is a fragmentary sectional view of the coupling showing one of the anchor bolts about to be applied or removed.

Referrring particularly to the drawings, the coupling is there shown as being applied to a pipe section 10 having a bell 11 which may be, and preferably is similar to that of an ordinary cast iron pipe section and the spigot end of a pipe section 12, which is shown as being plain, is inserted in the bell 11. It is to be understood, however, that the coupling is equally applicable to fittings of this character and to pipe sections which have double bell ends and double spigot ends.

In this example, there is shown a packing seat 13, which is preferably tapered and formed near the bottom of the bell 11 and a suitable packing, such as a wedge-shaped rubber ring 14, is adapted to be inserted in the bell against this seat. A packing glad 15, conveniently made of cast iron or other suitable metal, is adapted to be slipped over the spigot end of the pipe section 12 and is provided with a bolting flange 16 having a series of radial notches 17 to receive removable anchor bolts 18. Herein, the bolting flange has counterbores 19 about the bolt-receiving notches to accommodate cylindrical bosses 20 on the nuts 21 for the clamping bolts, so that the bolts are effectively interlocked with the flange and cannot slip loose.

As will be seen in Figs. 2, 4 and 7, the bell is provided with an annular groove 22 conveniently formed near the mouth to receive toes 23 formed on the clamping bolts 18. To enable these clamping bolts to be inserted or removed from the gland without disturbing or removing the gland, the bolts are shown as having cam-shaped heel portions 24 adapted to be inserted in longitudinal slots 25 provided in the gland and terminating short of the packing end, the idea being to permit the bolts, after the nuts have been loosened to swing radially and thereby disengage the toes 23 from the annular V-shaped groove 22. Obviously, the bolts can easily be applied by inserting the toes in the grooves and swinging the shanks inwardly, the heels having a cam action against the spigot. In Fig. 7, one of the bolts is shown as being applied to or removed from a coupling. The cam-shaped heels are shown as being roughened or knurled where they grip against the spigot when the nuts are tightened to prevent the spigot from slipping relative to the bell. The upper face of the V-shaped groove wedges the toes on the bolts inwardly so that the heels bite into the spigot. In this example, the lower end of the gland is shown as being tapered so as to fit in a V-shaped rubber packing ring (not shown) such as is common in this art.

From the foregoing description, it will be understood that the packing material, whether it be rubber, jute or other convenient packing, is seated in the bell and the packing gland is pushed in against the packing before the bolts are applied. Then the bolts may be applied one at a time and their nuts screwed up until the cylindrical bosses thereon are interlocked with the counterbores in the flange 16. After all of the bolts are applied, they may be tightened by means of an ordinary wrench to compress the packing as tightly as may be deemed advisable.

This type of packing gland and the anchor bolts can be made very cheaply and can be applied very quickly to bell and spigot pipes which have no special bolting flanges that require more shipping space and also increase breakage. No special machine operations are required to form the packing seat and the groove in the bell as these may be formed in the pipe casting. Further, the coupling is very strong and is practically as effective as if the pipe sections have integral bolting flanges and expensive machined parts.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A coupling for bell and spigot pipes and fittings of the character described comprising, in combination, a substantially cylindrical gland adapted to be slipped on the spigot and inserted in the bell; a bolting flange on said gland presenting bolt-receiving notches; packing material in the bell; and a plurality of anchor bolts adapted to be inserted in the mouth of the bell and interlocked therewith, said bolts having rounded heel portions on which they may be swung upon the spigot into said bolt-receiving notches.

2. A pipe coupling of the character described comprising, in combination, a pipe section presenting a bell having an annular groove adjacent to its mouth and a packing seat; a spigot section within said bell; packing material seated in said bell; a cylindrical packing gland slipped over the spigot and inserted within the mouth of said bell; said gland having a plurality of longitudinal grooves; a bolt receiving flange on said gland presenting a plurality of radial notches; and anchor bolts having toe portions adapted to be inserted in said annular groove; said anchor bolts also presenting cam-shaped heel portions within said longitudinal grooves of the gland and arranged to be wedged against the spigot when the bolts are tightened.

3. A pipe coupling of the character described comprising, in combination, a pipe section having a bell and an annular substantially V-shaped groove adjacent to the mouth of the groove; a spigot section within the bell; packing material seated in the bell about the spigot; a substantially cylindrical packing gland having a bolting flange; said gland presenting longitudinal grooves terminating short of the ends thereof and radial bolt-receiving notches; and a plurality of anchor bolts presenting toe portions and cam-shaped heel portions adapted to be inserted in said bell by swinging action within said grooves, said cam-shaped heel portions being roughened and adapted to be wedged against the spigot when said bolts are tightened to grip the spigot and prevent relative movement of the bell and spigot sections.

4. A pipe coupling of the character described comprising, in combination, a bell section and a spigot section, said bell section having a packing seat and an annular substantially V-shaped groove adjacent to its mouth; a packing gland having a bolt-receiving flange and radial notches therein; a packing ring seated in the bell; and a plurality of anchor bolts having rounded heel portions bearing against the spigot and interlocked with the bell by swinging action; and nuts for said anchor bolts having means interlocking with said bolt-receiving flange to prevent the bolts from sliding out of said notches.

5. In a pipe coupling of the character described, a bell having a packing seat and an annular groove arranged adjacent to the mouth of the bell; a packing gland adapted to be slid on a spigot to be inserted within said bell; said packing gland having a plurality of longitudinal slots; a bolt flange having radial bolt-receiving notches alined with said longitudinal slots; anchor bolts having toes adapted to engage said groove within the bell; cam-shaped, roughened heel portions on said anchor bolts adapted to slide into the bell within said longitudinal slots, said bolts adapted to be swung into interlocking engagement with the bell and with said bolting flange; and clamping nuts for said bolts presenting bosses, said bolting flange having counterbores about said bolt-receiving notches to receive said bosses on the nuts and thereby prevent the anchor bolts from sliding or swinging radially away from said bolting flange when the nuts are tightened.

6. In a pipe coupling of the character described, a bell having a wedge-shaped annular groove therein; a packing gland adapted to be inserted within said bell and presenting a series of longitudinal bolt-receiving slots; a bolting flange on the packing gland having bolt-receiving radial notches alined with said longitudinal slots; a plurality of anchor bolts having toe portions adapted to engage the groove within said bell; said anchor bolts also presenting cam-shaped heel portions within said longitudinal slots; threaded ends on said anchor bolts adapted to be swung inwardly and radially into engagement with said notches in the bolting flange to cause said toe portions to interlock with said annular groove; and nuts threaded on said anchor bolts having means interlocking with said bolting flange to prevent the bolts from swinging out of engagement with said flange when the nuts are tightened.

7. In a packed joint of the class described, a substantially cylindrical packing gland having a plurality of longitudinal slots; a flange on the outer end of said gland presenting radial notches alined with said slots; anchor bolts each having one end shaped to be inserted in the slots and the other ends with rounded heel portions on which the bolts are adapted to be swung into anchoring position with their shanks in said notches; and nuts threaded on said shanks adapted to engage said flange.

In testimony that I claim the foregoing as my own, I have hereto affixed my signature.

ARTHUR T. McWANE.